J. M. DILLON.
Stump-Extractor.

No. 209,752. Patented Nov. 12, 1878.

WITNESSES: James M. Dillon INVENTOR
By Howard Bros
his ATTORNEYS

UNITED STATES PATENT OFFICE.

JAMES M. DILLON, OF WHEELING, WEST VIRGINIA.

IMPROVEMENT IN STUMP-EXTRACTORS.

Specification forming part of Letters Patent No. 209,752, dated November 12, 1878; application filed June 6, 1878.

*To all whom it may concern:*

Be it known that I, JAMES M. DILLON, of Wheeling, in the county of Ohio and State of West Virginia, have invented certain new and useful Improvements in Stump-Extractors; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates specially to a machine for pulling sassafras-tree stumps and roots; and it consists of a peculiar construction of mechanism whereby I am enabled, with great ease and speed, to pull tree-stumps with all the roots attached, without the necessity of grubbing or cutting the roots before attempting to pull the stump, the action of the machine being such as to pull the roots entire without twisting or breaking them—a very important feature in procuring roots of sassafras-trees for the purpose of converting into oil.

Figures 1, 2:
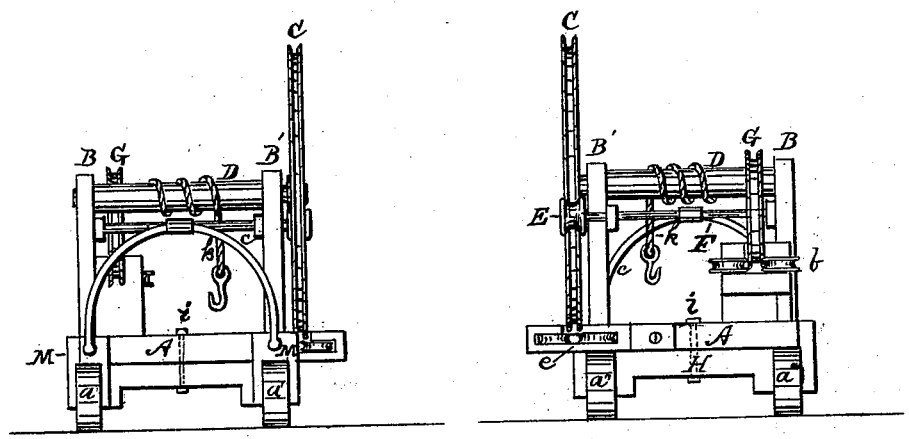
Figure 3:
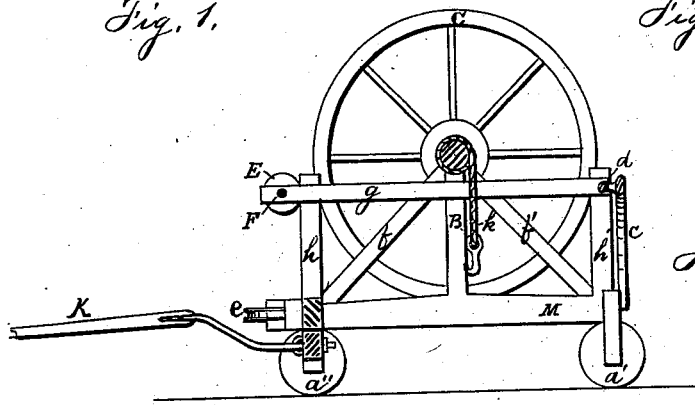
Figure 4:
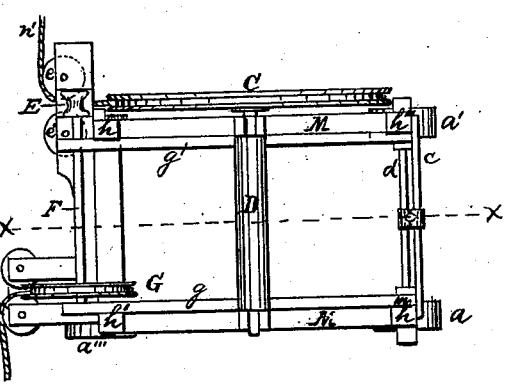

In the drawings, Figures 1 and 2 are end views of the machine; Fig. 3, a section through line $x\ x$; Fig. 4, a top view.

Like letters of reference refer to like parts.

The letter A represents the frame or carriage which supports the working mechanism; M, sill-piece; $h\ h'\ h''\ h'''$, corner-posts; $g\ g'$, top rails; B B', standards, braced to the sill-piece M with side pieces, $f f'$. The frame is mounted upon broad traction-wheels $a\ a'\ a''\ a'''$, the rear wheels, $a\ a'$, being journaled under the corners of the frame, with suitable supports, the front wheels, $a''\ a'''$ being attached to an axle, H, upon which the front end of the frame rests, and is secured by the bolt $i$.

D is a drum-shaft, journaled to standards B B', around which is wound the lifting-chain $k$. C is a large wheel, attached to end of drum-shaft D, having a pulling-rope, $n^1$, attached to its rim, which is grooved to receive the same and prevent it slipping off. F is a shaft, journaled through the frame of the carriage near the front end, having wheels of unequal diameter, G and E, at each end of the shaft. The wheel G is about three times larger than the wheel E, and has a pulling-rope, $n^2$, attached to its rim, similar to the large wheel C. The wheel E is on a line with and in close proximity to the large wheel C.

$e\ e'$ and $b\ b'$ are double pulley-sheaves, attached to the frame of the carriage on a line with and close to the wheels C and G, by which arrangement of the pulleys the motive power can pull in any direction where there is no obstruction. K is a tongue, attached to axle H. $c$ is a curved brace, on the rear end of the frame-work, to prevent the sides from spreading, the end of the frame being left open, to permit placing the machine over a stump and removing the same when the stump is raised out of ground.

The mode of operation is as follows: In pulling small stumps—say, under eight inches diameter—the machine is placed over the stump, and the chain $k$ fastened to the same close to the ground. The end of the rope $n^1$ around the large wheel is placed through the sheave between the pulleys $e\ e'$ and attached to the motive power, which, when power is applied, causes the drum D to revolve, winding up the chain $k$, and raising the stump, the arched brace $c$ on rear of carriage permitting the vehicle to be removed when the operation is completed.

In pulling large stumps, where more power is needed, the rope $n^1$ is attached to the small drum E, the rope $n^2$ on the drum G is passed through the sheaves between the pulleys $b\ b'$, and the motive power attached, which imparts a multiplied rotary motion to the drum D, by means of which the stump is raised from its position by a direct pull, bringing with it all the roots intact.

Having described my invention, what I claim, and desire to secure by Letters Patent, is—

1. In a stump-pulling machine, the frame A, mounted on wheels $a\ a'\ a''\ a'''$, and the drum D, chain $k$, wheel C, rope $n^1$, and sheaves $e\ e'$, placed flatwise close together directly in front of the wheel C, with the rope passing between them, whereby the rope may be pulled either to the right, left, or straight ahead, all arranged, combined, and operated substantially as herein described.

2. The combination, with the frame A, wheels $a\ a'\ a''\ a'''$, drum D, chain $k$, wheel C, rope $n^1$, and shaft F, drum-wheel E, and power wheel G, rope $n^2$, and sheaves $b\ b'$, placed flatwise close together directly in front of the wheel G, with the rope passing between them, whereby the rope may be pulled in any direction, all arranged, combined, and operated substantially as herein described.

3. In a stump-pulling machine, the combination, with the frame-work of the carriage A, of the arched brace $c$, substantially as herein shown, and for the purposes set forth.

In testimony that I claim the foregoing as my own I hereby affix my signature in presence of two witnesses.

JAMES M. DILLON.

Witnesses:
 J. W. PAXTON,
 BENJ. BLOOMFIELD.